United States Patent [19]

Young

[11] Patent Number: 4,927,095

[45] Date of Patent: May 22, 1990

[54] PLANETARY GEAR DRIVE FOR FISHING REEL

[75] Inventor: John N. Young, Fairfax, Calif.

[73] Assignee: Charles C. Worth Corporation, Kentfield, Calif.

[21] Appl. No.: 298,929

[22] Filed: Jan. 23, 1989

[51] Int. Cl.$^5$ .......................................... A01K 89/015
[52] U.S. Cl. .................................... 242/261; 242/255; 242/267; 242/268
[58] Field of Search ............ 242/217, 218, 221, 84.42, 242/84.5 A, 84.51 A, 82.52 R, 84.52 B, 268, 255, 264, 260, 261, 267

[56] References Cited

U.S. PATENT DOCUMENTS

| | | | |
|---|---|---|---|
| 2,918,227 | 12/1959 | Mauborgne | 242/84.5 A |
| 4,232,842 | 11/1980 | Noda | 242/217 |
| 4,566,655 | 1/1986 | Young | 242/215 |
| 4,572,454 | 2/1986 | Furumoto | 242/84.52 B |

FOREIGN PATENT DOCUMENTS

324595 1/1930 United Kingdom ................ 242/219

Primary Examiner—Katherine A. Matecki
Attorney, Agent, or Firm—Melvin R. Stidham

[57] ABSTRACT

A planetary gear drive system for a fishing reel wherein a spool shaft and a handle shaft are coaxial, the handle shaft carrying a ring gear and the spool shaft carrying a driven pinion. Planetary gears rotatable on a planetary gear carrier engage both the ring gear and the driven pinion at equal angles around the driven pinion. Friction brake means as well as free spool cam means operate directly on the common axis of the handle shaft and spool shaft.

5 Claims, 8 Drawing Sheets

PLANETARY GEAR DRIVE FOR FISHING REEL

ORIGIN OF THE DISCLOSURE

This application is based on Disclosure Document No. 169,826, which was deposited in the U.S. Patent and Trademark Office on May 11, 1987.

BACKGROUND OF THE INVENTION

In conventional fishing reels, a pinion gear on the spool shaft is driven by rotation of a handle on an axially displaced handle shaft through a main gear, which meshes with the pinion at one point of contact only. This results in an unbalanced force applied to the pinion gear that tends to push the main and pinion gears apart. Conventional reel designs provide for substantial support post and bearing surfaces in order to compensate for this unbalanced driving force. Accordingly, it would be highly desirable to provide for balanced drive forces around the circumference of the pinion gear. However, in conventional reel gear driving systems, with the handle shaft and the spool shaft on axes, which are displaced from each other, there is room to accommodate certain auxiliary driving reel mechanisms, such as drag systems, free spool mechanisms, level wind mechanisms and braking means.

OBJECTS OF THE INVENTION

It is an object of this invention to provide a gear driving system for a fishing reel that provides balanced driving forces around the circumference of the pinion gear.

It is a further object of this invention to provide a balanced force gear driving system with associated mechanisms that may be operated in conventional fashion by a fisherman.

It is a further object of this invention to provide a balanced force fishing reel with associated mechanisms that operate at a performance level at least equal to that of conventional driving systems.

Further objects and advantages of this invention will become apparent from the description to follow, particularly when read in conjunction with the accompanying drawings.

SUMMARY OF THE INVENTION

In carrying out this invention, I provide an epicyclic or planetary gear drive for a fishing reel which provides balanced forces around the driven pinion gear. In such system the input or handle shaft drives a ring gear which, through planetary gears, drives the output or pinion gear, which is on the same axis as the input shaft. Because the input and output shafts are coaxial, conventional auxiliary systems, such as drag systems, free spool mechanisms and casting brake systems cannot always be accommodated. Accordingly, I provide unique means to actuate the drag system, level wind mechanism, free spool mechanism and casting brake systems of the fishing reel.

DESCRIPTION OF PREFERRED EMBODIMENTS

Figure 1:
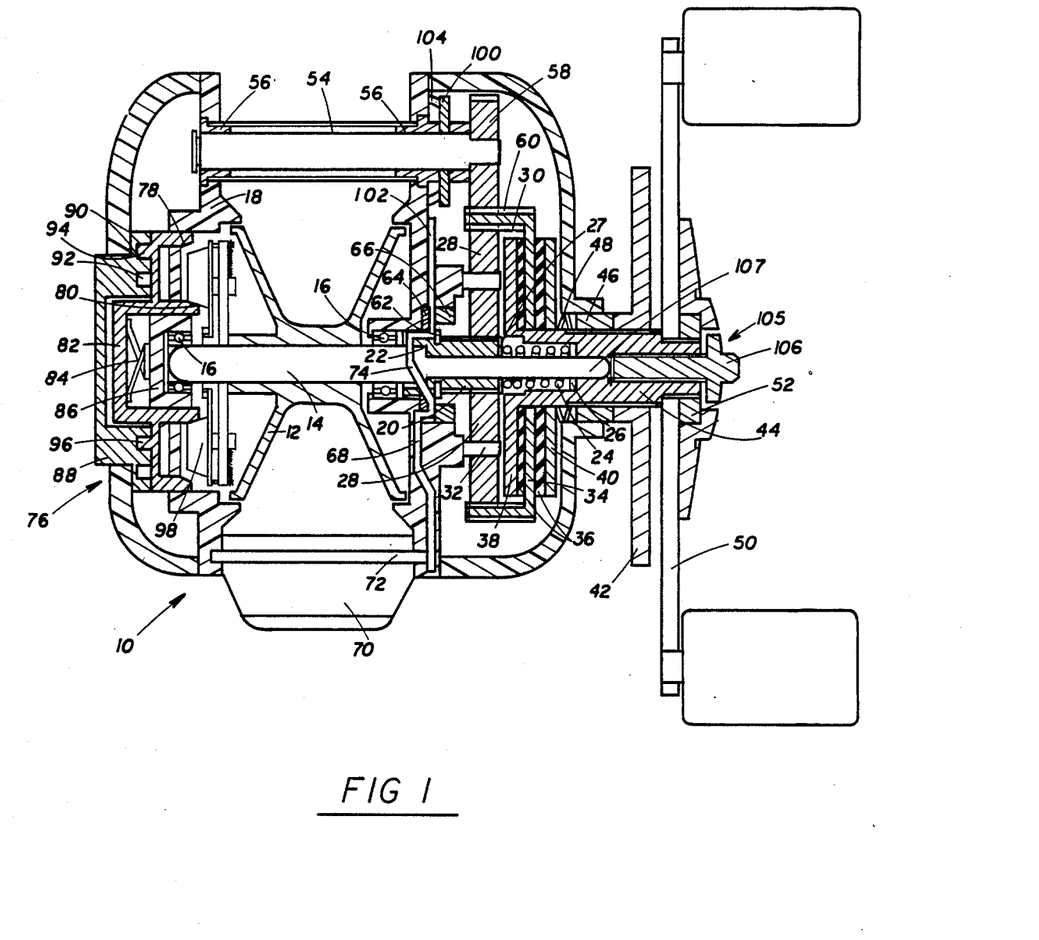
FIG. 1 is a section view of a bait cast fishing reel showing one embodiment of this invention.
Figure 1A:
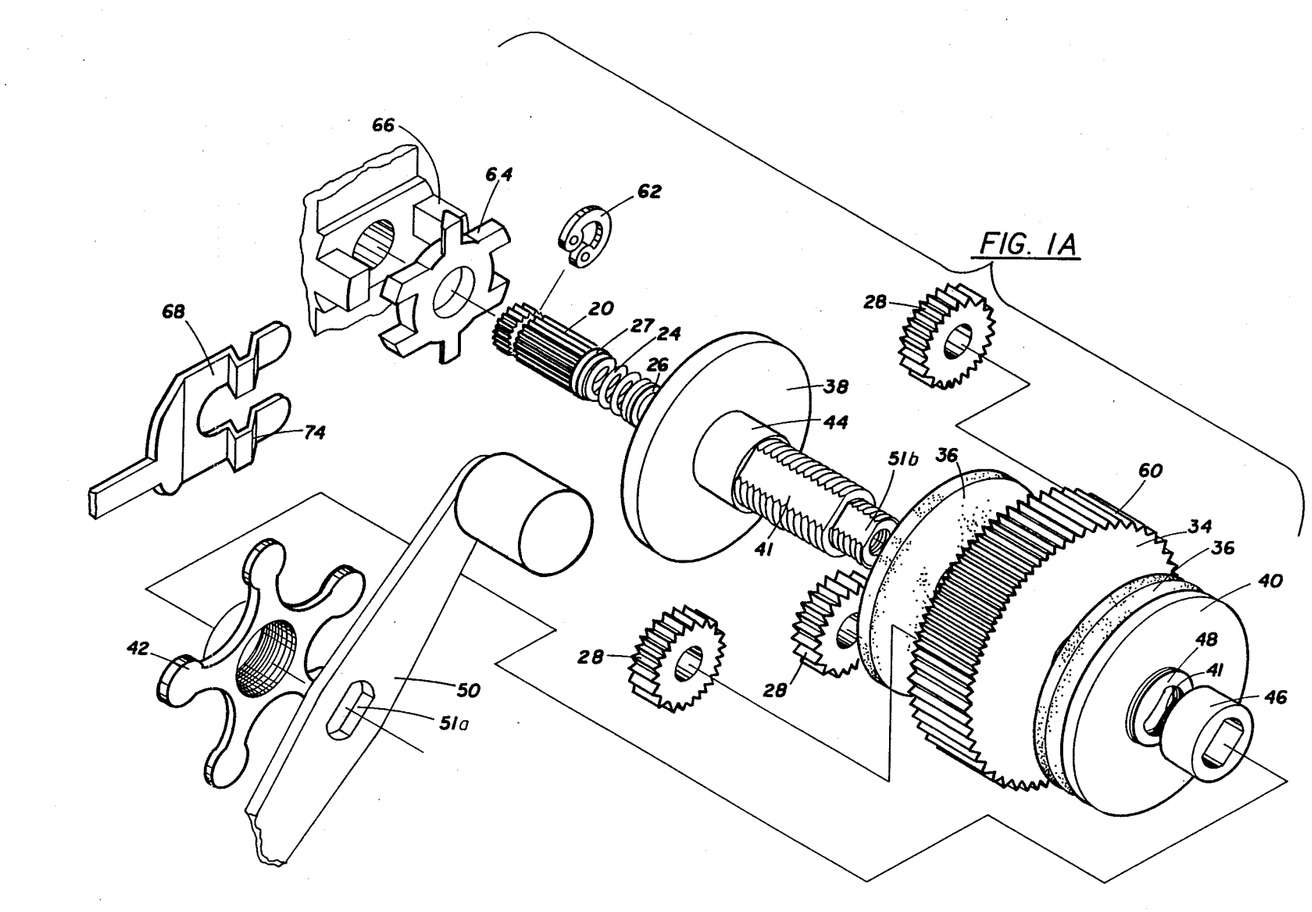
FIG. 1A is an exploded view showing the free spool mechanism of the FIG. 1 embodiment.

The Embodiment of FIGS. 1 and 1A

In the bait cast reel 10 of this embodiment, a spool 12 is fixed to the spool shaft 14 which, in turn, is rotatably mounted in ball bearings 16 fixed in the main frame 18. A pinion gear 20 is slidably carried on the spool shaft 14, but is keyed thereto at 22 to rotate therewith. A pinion spring 24 is freely carried on the spool shaft 14 and is biased between a handle shim 26 and the pinion 20 through pinion shim 27 to hold the pinion keyed to the spool shaft 14.

A number of planetary gears 28 mesh with the pinion gear 20 at equally spaced points around the pinion gear so as to be balanced with respect thereto, the planetary gears 28 being driven by a universe or ring gear 30. The planetary gears 28 are rotatably mounted on pins 32 fixed to the main frame 18 to drive the pinion gear 20 when the planetary gears 28 are rotated by the ring gear 30.

The universe or ring gear 30 is driven when its top plate 34 is pinched between friction washers 36 which, in turn, are squeezed between a drag flange 38 on the handle shaft 44 and a drag plate 40 keyed at 41 on the handle shaft 44. A drag star 42 is threadedly mounted on the handle shaft 44 to tighten or loosen the drag stack just described, through a drag bushing 46 and drag spring washers 48. The drag flange 38 is, of course, integral with the handle shaft 44 and the drag washer 40 is slidable but not rotatable thereon so that tightening the drag stack 34, 36, 38 and 40 causes the ring gear 30 to rotate with the handle shaft, subject to being overcome by an excessive pull on the line (not shown). The handle 50 is keyed at 51a, 51b (FIG. 1A) onto the handle shaft 44 and secured by a handle nut 52.

A level wind screw 54 is rotatably carried on the main frame 18 in bushings 56, and a gear 58 keyed to the level wind screw 54 is driven by gear teeth 60 on the outer perimeter of the ring gear 30.

A pinion clip 62 is secured in a complementary groove in the pinion gear 20 and the pinion yoke 64 has a central bore surrounding the pinion gear. The pinion yoke 64 is slidably aligned in the main frame 17 by guide posts 66 and the free spool slide 68 is slidably mounted on the main frame 18. A thumb bar 70 is pivotally mounted on the main frame 18 on a thumb bar pin 72 so that when the thumb bar is pressed, the slide 68 advances toward the front of the reel 10, i.e. away from the angler. As the slide 68 so advances, the ramp or cam portion 74 presses against the pinion yoke 64 which, in turn, pushes against the pinion clip 62 causing the pinion 20 to move outwards in the direction of the handle 50 to become unkeyed from the spool shaft 14. This isolates all the gears and driving members from the spool shaft and leaves the spool shaft and spool 12 free to rotate while casting.

Suitable braking means 76 to retard rotation of the spool 12 during casting are described in my earlier U.S. Pat. No. 4,601,438, granted July 22, 1986. The braking means includes tapered brake drums 78 and 80, which are fixed as a unit to the brake slide 82. A spring washer 84, which is positioned between the slide 82 and a main frame portion 86, biases the slide 82 outward, in the direction of a control knob 88. Ramped radial recesses 90 and 92 in the adjustment knob 88 receive pins 94 and 96 on the slide 82 so that, as the control knob 88 is rotated in one direction the pins 94 and 96, as well as the tapered drums 78 and 80 are pressed inward toward the spool 12, effectively decreasing the diameters of the drum being engaged by the rotating brake shoes 98, thus increasing the brake strength during casting. By rotating the control knob 88 in the opposite direction, the spring 84 presses the slide 82 away from the spool 98 to increase the diameter of the tapered brake drums 78 and 80, thus easing braking action during casting.

After casting, the planetary gear drive 30, 28, 20 is again activated by a free spool release cam 100, which is fixed to rotate with the lead screw 54. When the free spool slide 68 is moved forward from the position shown in FIG. 1 for free spool casing, as previously described, the end 102 of the free spool slide is moved into the path of rotation of tabs 104, which extend from the release cam 100.

Then, after casting, when the handle 50 is turned to reel in the line (not shown) the drive level wind gear 58 is rotated by the gear teeth 60 to rotate the release cam 100. As the cam 100 rotates, tabs 104 press the free spool slide 68 back to the position shown in FIG. 1, moving the ramped portion 74 out from under the pinion yoke 64, allowing the pinion spring 24 to urge the pinion 20 back into key with the spool shaft 14. This again connects the driving members to the spool shaft to enable the line to be rewound onto the spool 12 when the handle 50 is rotated.

Casting friction adjustment means 105 is operated against the spool shaft 14 by rotation of an adjustment knob 106. Threading the adjustment knob 106 causes the end to bear against an extension 107 of the spool shaft 14. The ability to adjust a frictional bias against the spool shaft 14 through the axis of the handle shaft 44 is a specific feature of this invention in that conventional reels do not have the spool shaft axially aligned with the handle shaft.

Figure 2:
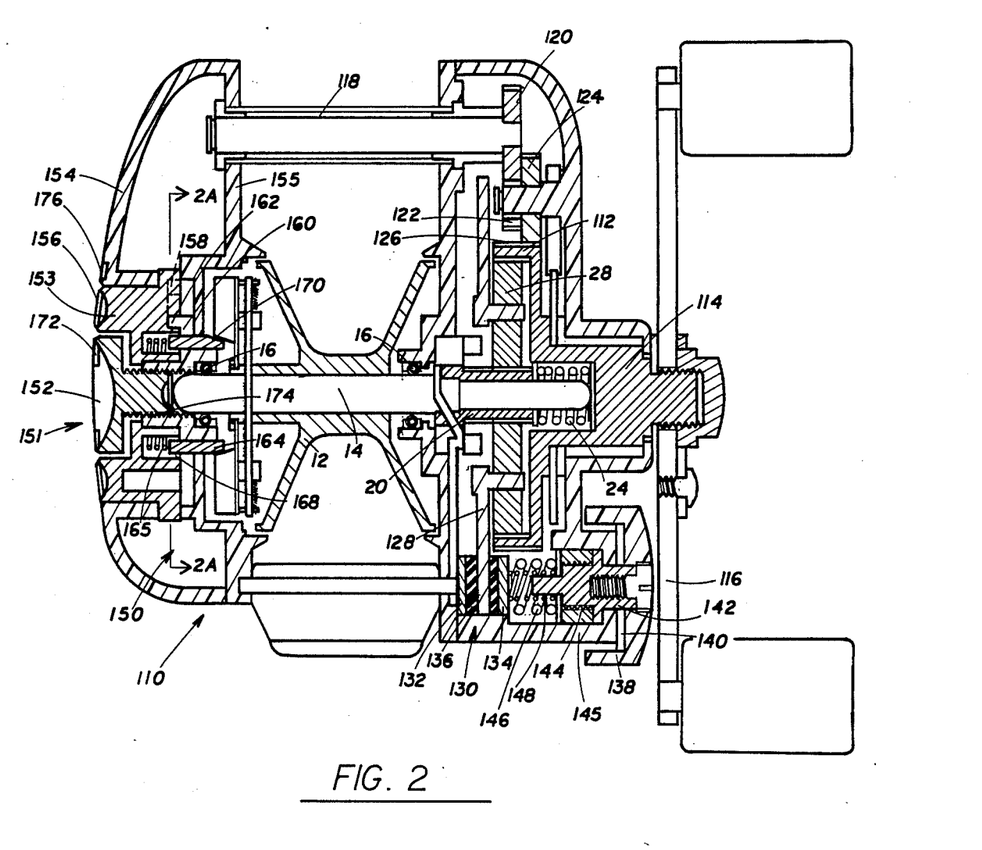
FIG. 2 is a section view of a bait cast fishing reel showing another embodiment of this invention.
Figure 2A:
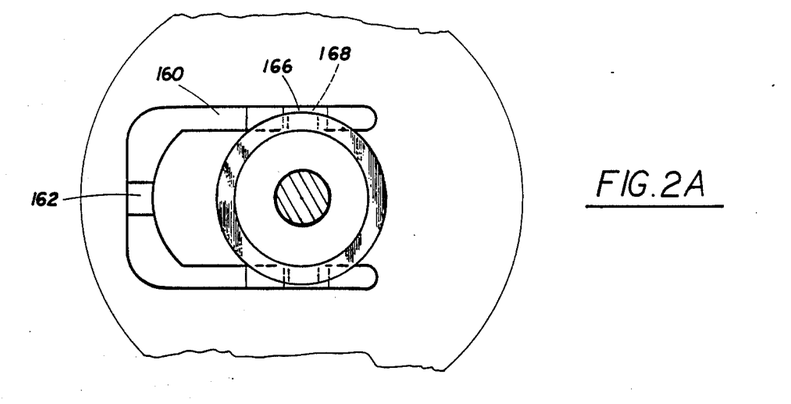
FIG. 2A is a partial section view taken along line 2A—2A of FIG. 2.

The Embodiment of FIGS. 2 and 2A

The bait cast reel 110 of this embodiment has a spool 12 mounted on a spool shaft 14 carried in ball bearings 16 as in the embodiment of FIG. 1. Also as in FIG. 1, a pinion 20 is driven by planetary gears 28 which, in turn, are driven by a ring gear 112. In this case, the ring gear 112 is integral with the handle shaft 114 so that rotation of the handle 116 drives the planet gears 28 directly.

The level wind 118 is driven by rotation of a gear 120, which is driven at reduced speed by a transfer gear 122 that rotates together with the pinion 124, which meshes with gear teeth 126 on the outer periphery of the ring gear 112. Since the diameter of the transfer gear 122 is smaller than that of the gear 124, there is a reduced gear driving ratio to the level wind gear 120 from the outer ring gear 126.

The planetary gears 28 are rotatably mounted on a plate 128 and, when the plate 128 is gripped by means of a drag stack 130 the planet gears 28 are activated to drive the pinion 20. The plate 128 is frictionally squeezed by the drag stack 130, which consists of washers 132 and 134, between which are sandwiched the friction washers 136. A drag adjustment knob 138 is keyed to a washer 140 which, in turn, is keyed to a drive screw 142. The drive screw 142 is threaded into a drag nut 144, which is slidably keyed in side plate 145 so that, as the drag control knob 138 is rotated, the plunger nut 144 advances against a spring 146 to apply pressure to the drag stack 130. Preferably, a small spring 148 is provided to transfer light pressure settings to the drag stack 130.

Also in this embodiment, a speed variable friction casting brake 150 of the type described in connection with FIG. 1 is combined with a second frictional casting brake 151 to provide dual means of adjustment, as will be described. Inner and outer control knobs 152 and 153 are rotatably carried between the reel side plate 154 and the main frame 155 and are coaxial with the spool shaft 14. On one face of the outer control knob 153 is a dial 156, and on the other face is a spiral groove 158 of constant draft axial to the outer control knob 153. An adjustment slide 160 which is slidable on the main frame 155 has a tab 162 that engages in the spiral groove 158 so that as the control knob 153 is rotated, the slide 160 is moved toward or away from the axis of rotation of the control knob 153.

A tapered drum 164 is biased away from the control knob 153 by means of a spring 165.

The slide 160 has an inclined portion 166 that engages tabs 168 carried on the tapered drum so that, as the slide 160 is moved toward the axis of the control knob 153, the inclined portion presses the tapered drum 164 towards minimum engagement with the tapered brake shoes 170. As the slide 160 is caused to move away from the axis of the control knob 153, the ramp portions withdraw from engagement with the tabs 168 so that the spring 165 urges the tapered drum 164 into firmer engagement with the brake shoes 170.

The inner adjustment knob 152 has a dial 172 on the face thereof and is threaded at 174 to the main frame 155 to bear against the spool shaft 14. Hence, as the adjustment knob 152 is turned in one direction or the other, friction bias is added to or subtracted from the spool shaft 14 to increase or decrease braking action during casting.

The side plate 154 has a fixed mark 176 against which to read the dial 156 on the outer control knob 153. The dial 172 on the inner control knob is read relative to dial 156 on the outer control knob so that the dial readings of the dials 156 and 172 are interrelated. It can be seen that changing the setting of one dial automatically changes the relative reading on the outer dial so that the angler can at all times know the degree to which one casting brake adjustment affects the other.

Figure 3:
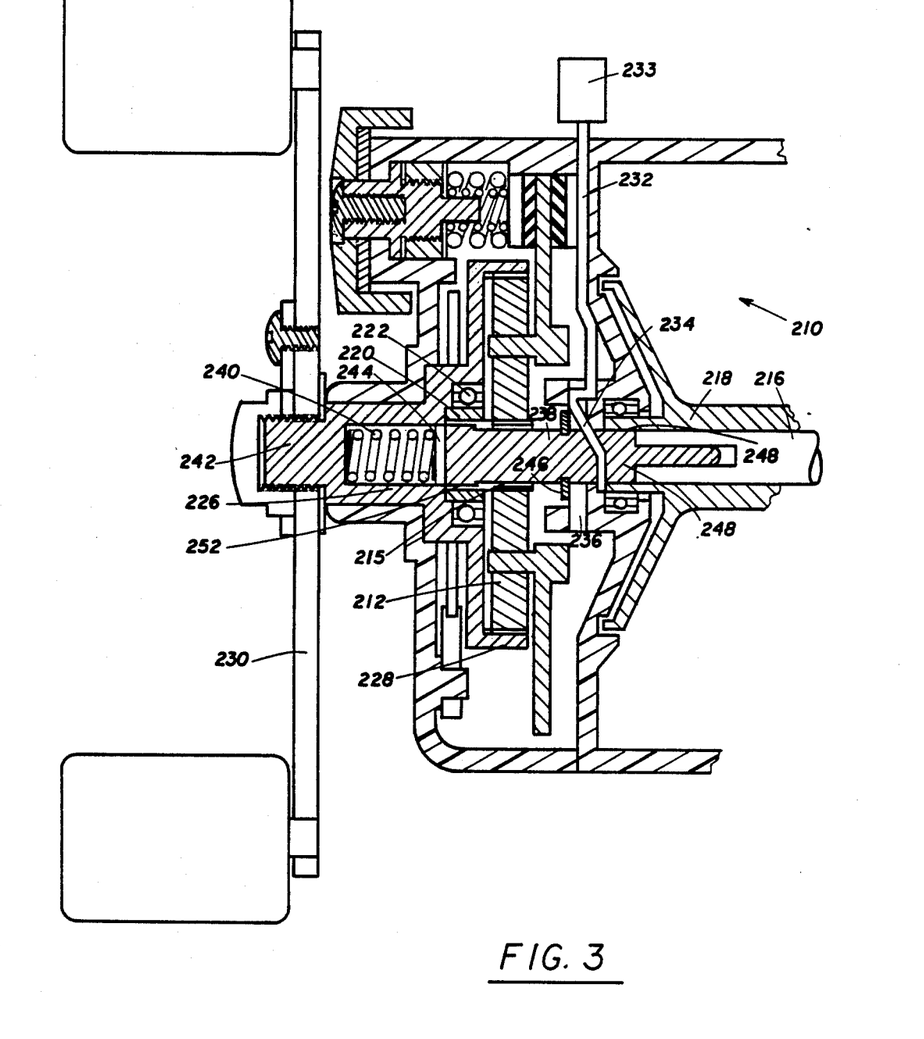
FIG. 3 is a partial section view showing still another embodiment of this invention with a preferred free spool mechanism.
Figure 3A:
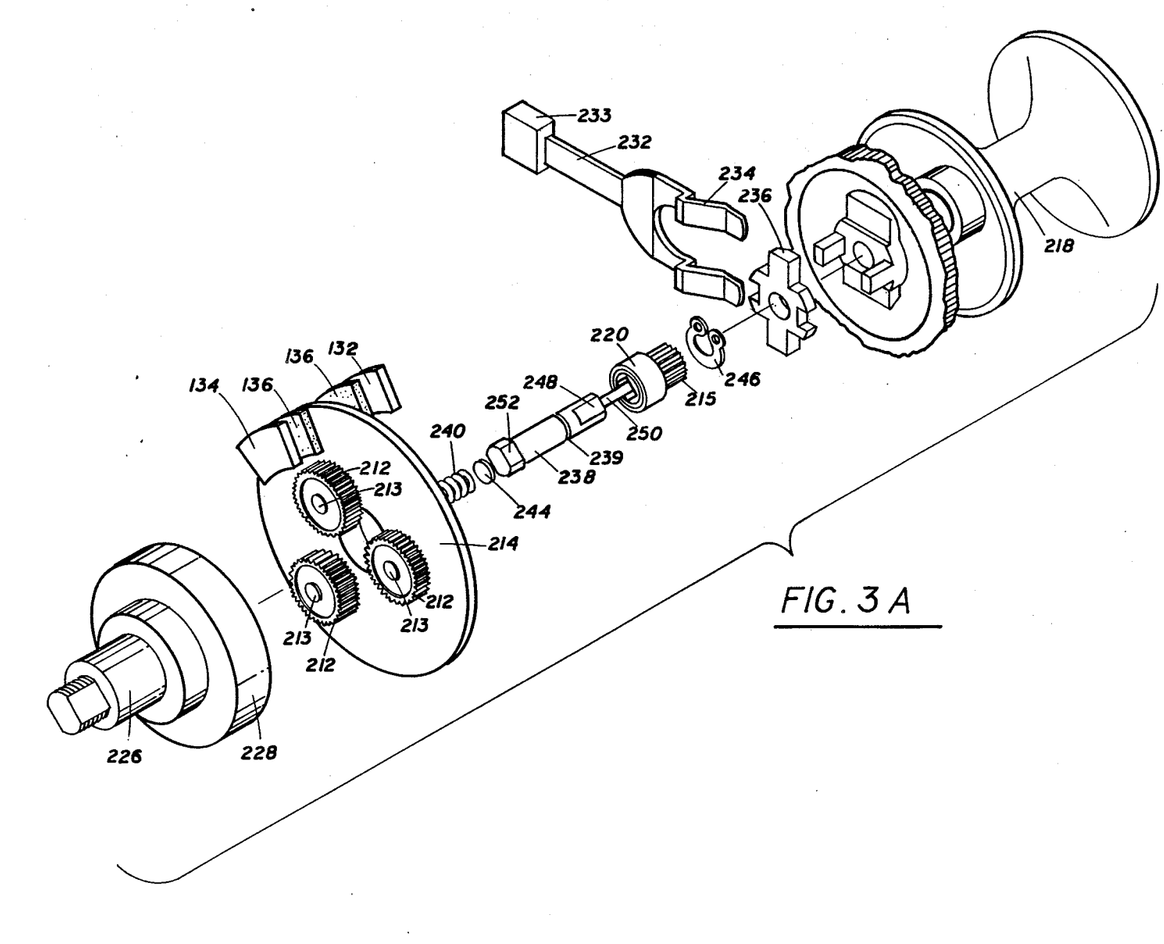
FIG. 3A is an exploded view showing the free spool mechanism of the embodiment of FIG. 3.

The Embodiment Of FIGS. 3 and 3A

The bait cast reel 210 of this embodiment is, in most respects, the same as that described in connection with FIG. 2. As in the previous embodiments, a plurality of planetary gears 212, which are rotatably mounted on pins 213 are evenly spaced arcuately around the disc 214 to hold the pinion 215 in axial alignment with the spool shaft 216 carrying a spool 218. A pinion reinforcement bushing 220 is fixed to the pinion 215 to rotate together therewith in ballbearings 222 mounted in the handle shaft 226. The ring gear 228 is integral with the handle shaft 226 so that rotation of the handle 230 drives the planet gears 212 directly to drive the pinion 215.

The free spool slide 232 carries a thumb button 233 so that the angler can activate the free spool condition by pressing forward on the button 233. The free spool slide 232 has a ramp or inclined portion 234 that engages the bottom of the yoke 236 so that when the slide 232 is pushed in the direction of the plunger 238, the yoke 236 is urged in the direction of the handle 230. A plunger spring 240 biases between the handle shaft 242 and the plunger shim 244 to urge the plunger 238 toward the spool shaft 216. A C-shaped clip 246 is fixed in a groove 239 of the plunger 238 so that the plunger 238 and clip 246 move as a unit. The plunger 238 is keyed at 248 to the spool shaft 216 and is supported axially thereto by means of a pin 250. The plunger 238 is keyed to the pinion gear 215 at 252 and is held interlocked with said pinion and the spool shaft 216 by the force of the spring 240 acting through the spool shim 244.

When the yoke 236 is urged in the direction of the handle 230 as just described, the plunger 238 is unkeyed from the spool shaft 216 at 248 to disconnect the spool 218 from the gear train 228, 212 and 215, enabling the spool to rotate freely during casting. When the free spool control slide 232 is urged away from the plunger yoke 236, the yoke 236 and plunger 238 are urged back toward the spool by the spring 240 so that the plunger 238 again keys with the spool shaft 216 at 248. This reconnects the spool 218 to the gear train.

Figure 4:
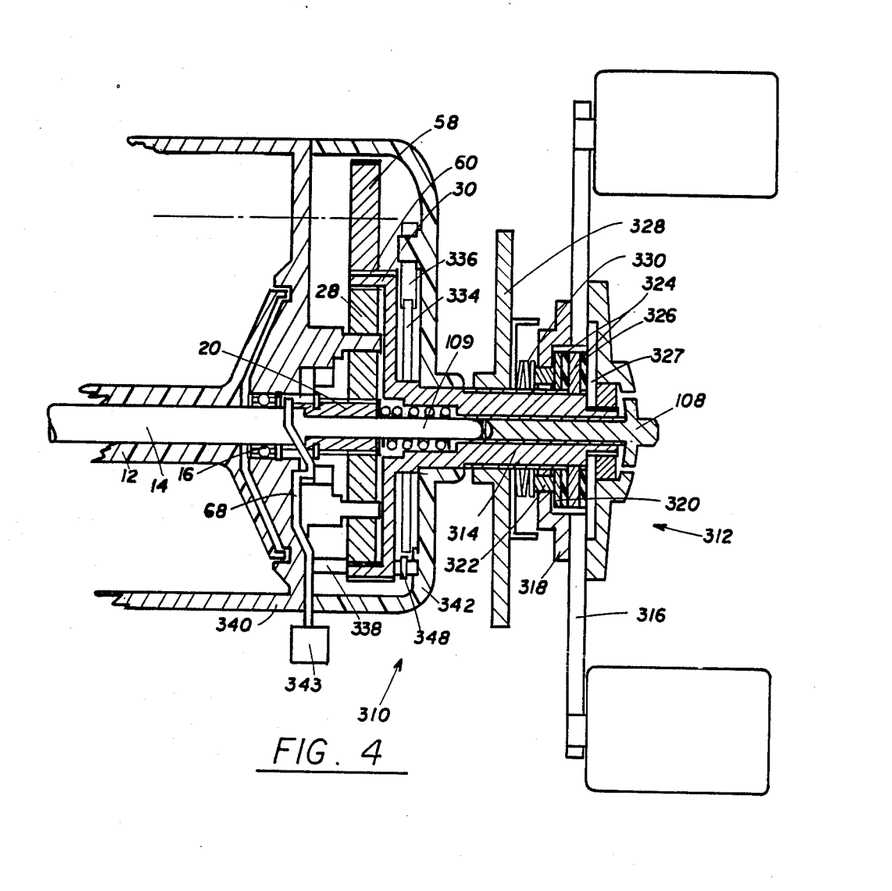
FIG. 4 is a partial section view of an embodiment with the drag system incorporated in the handle.
Figure 4A:
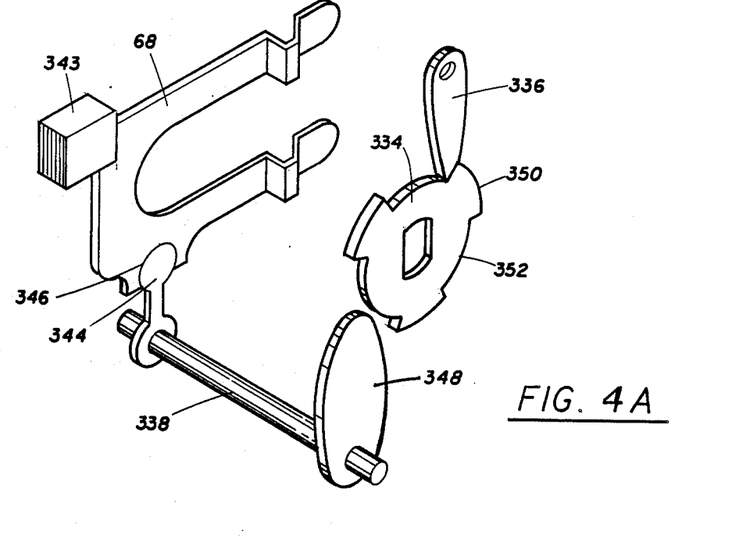
FIG. 4A is a view in perspective of the free spool release mechanism of FIG. 4.

The Embodiment of FIGS. 4 and 4A

The bait casting reel 310 of this embodiment includes a planetary gear driving system 30, 28 and 20 similar to that described in connection with the embodiment of FIG. 1 except, however, this embodiment 310 has an external drag system 312 similar to that described in my co-pending patent application Ser. No. 150,915 filed Feb. 1, 1988, now U.S. Pat. No. 4,815,676, issued Mar. 28, 1989.

The handle shaft 314 is an integral part of the ring gear 30 and is, itself, the output shaft of the drag mechanism 312. Hence, the universe or ring gear 30 is frictionally driven by the fishing reel handle 316. A radial flange 318 is fixed to the handle 316, and a drag plate 320 with fixed pins 322 rotates with the handle by engagement of the pins 322 through complementary openings in the radial flange 318. A driving flange 326 is keyed slidably on the handle shaft 314 and is squeezed between the handle flange 327 and the drag plate 320 through friction washers 324. The amount of squeezing or drag adjustment is provided by a drag star 328 through springs 330.

A ratchet 334, which is keyed to the handle shaft 314 is engaged by a pawl 336, which is pivotally carried on the side plate 342 to prevent reverse rotation of the handle shaft 314. Such reverse rotation would otherwise cause unwinding of line from the reel spool 12.

A pivot pin 338 is supported partially rotatable between the main frame 340 of the reel 310 and the side plate 342. Fixed on the pin 338 is a slide lever 344, (FIG. 4A) which engages in a slot 346 in the free spool slide 68. A ratchet lever 348 is fixed at the other end of the pivot pin 338 so as to be aligned with the ratchet 334.

The slide lever 334, the pivot pin 338 and the ratchet lever 348 pivot as a unit so that, when the free spool slide 68 is urged towards the spool shaft 14, by pressing thumb button 343 the ratchet lever 348 is urged into engagement with the ratchet 334 in the recess 352 between the ratchet teeth 350. In that position of the free spool slide 68, the spool 12 is in "free spool" condition and the line may be freely cast.

When the handle 316 is rotated, the ratchet 334 rotates with it, causing the ratchet teeth 350 to turn the ratchet lever 348 back in the opposite direction to pivot the slide lever 344, pulling the free spool slide 68 away from the spool shaft 14, returning the reel to a condition wherein the gear driving system 30, 28 and 20 are in driving condition, as previously described.

Figure 5:
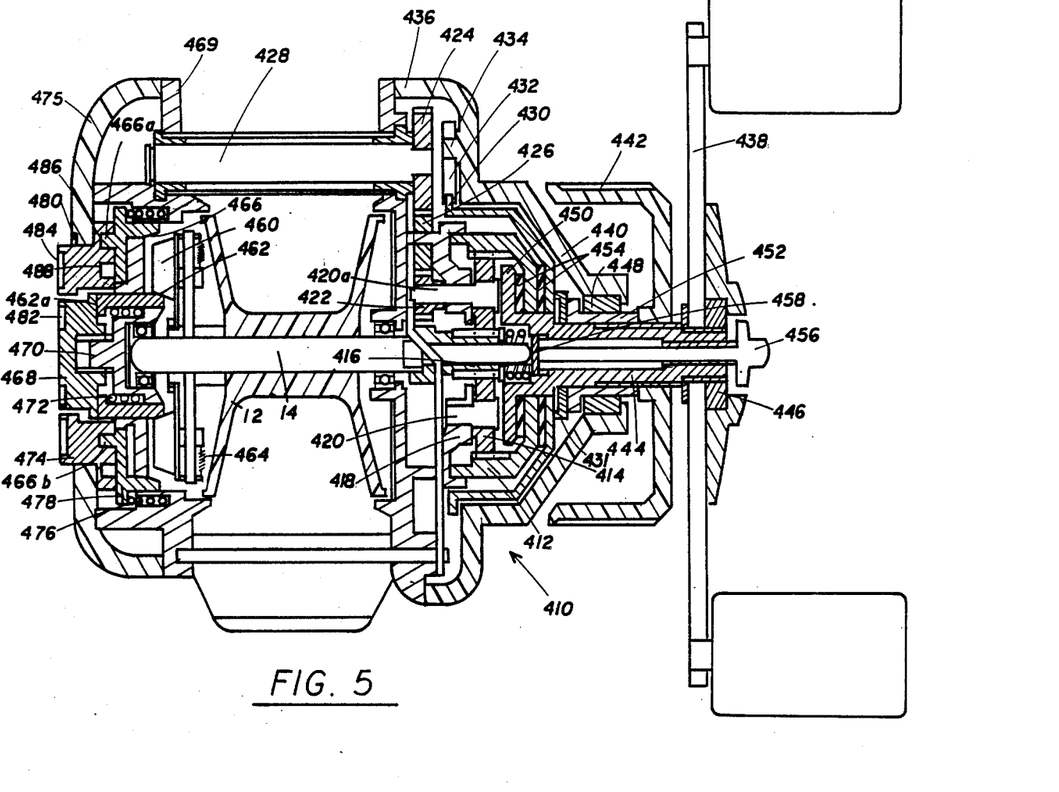
FIG. 5 is a section view of a bait cast fishing reel showing still another embodiment of this invention.

The Embodiment of FIG. 5

In the bait cast reel 410 of the embodiment, a ring gear 412 engages and rotates a plurality of planetary gears 414 which, in turn, drive a pinion 416. The planetary gears 414 are rotatably mounted on the main frame 418 on fixed pins 420. One pin 420A is extended through the main frame 418 and rotatably carries a secondary gear 422 to drive a level wind gear 424 through a transfer bear 426. Hence, both the main pinion gear 416 and the level wind screw 428 are drive by the ring or universe gear 412. An anti reverse ratchet 430, which is keyed to handle shaft 444 and which surrounds the universe gear 412 is engaged by a pawl 432, which is pivotally mounted at 434 on the side plate 436 to prevent reverse rotation of the handle 438 in conventional fashion.

Both the anti reverse ratchet 430 and the ring gear 412 have tapered portions, which are accomodated within a tapered portion 440 of the side plate 436. This leaves space for an enlarged drag dial surface 442, providing ample gripping surface for manipulation and adjustment by the angler.

The handle 438 is keyed to the handle shaft 444 and fixed thereto by handle nut 446. The handle shaft 444 is rotatably mounted in the side plate 436 in a bearing 448. A drag flange 450, which is integral with the handle shaft 444, and a drag plunger 452 slidably keyed to the handle shaft 444, provide friction drive to the ring gear 412 through anti-reverse ratchet 430 and spacer 431 by squeezing ring gear 412 through friction washers 454. This friction driving pressure is adjusted by rotation of the drag dial 442.

It will be seen that the bait cast reel 410 of this invention has a threeway braking control. One casting brake 456 is adjusted to apply friction bias to one end of the spool shaft 14 through a shim 458.

Another frictional braking system of the type shown in my prior U.S. Pat. No. 4,601,438 granted July 22, 1986 is applied to the other end of the spool shaft 14. The brake system comprises weights or brake shoes 460, which are biased inward against one tapered drum surface 462 under bias of spring means 464 and are biased outward against an outer tapered drum surface 466 by centrifugal force.

An inner control knob 468 is threaded onto the main frame 469 at 470. The inner control knob engages a flattened portion 462a of the inner tapered drum 462. A spring 472 biases the drum 462 towards the inner control knob 468. By turning the inner control knob in one direction the inner tapered drum 462 is moved to place the inner tapered drum 462 in greater engagement with the brake shoes 460 and rotation of the knob in the other direction enables the spring 472 to move the tapered drum 462 to decrease the braking surface with the brake shoes 460.

The outer control knob 474 is rotatably mounted in the side plate 475. A spring 476 is disposed between the main frame 469 and a flange 478 on the outer brake drum 466 to urge the outer brake drum 466 away from the brake shoes 460.

The outer control knob 474 has recesses 486 and 488 of tapered depth to receive pins 466a and 466b on the tapered drum 466 so that, as the outer control knob 474 is rotated in one direction, it forces the brake drum 466 to the right in FIG. 5 against the spring 476, increasing the contact area between the brake drum 466 and the brake shoes 460. As control knob 474 is rotated in the opposite direction, the brake drum 466 is moved by spring 476 to decrease the contact area between the brake drum 466 and the brake shoes 460. A fixed mark 480 on the side plate 475 interacts with dial 484. Dial 482 on the inner control knob and dial 484 on the outer control knob are read with respect to each other as described in connection with FIG. 2.

Figure 6:
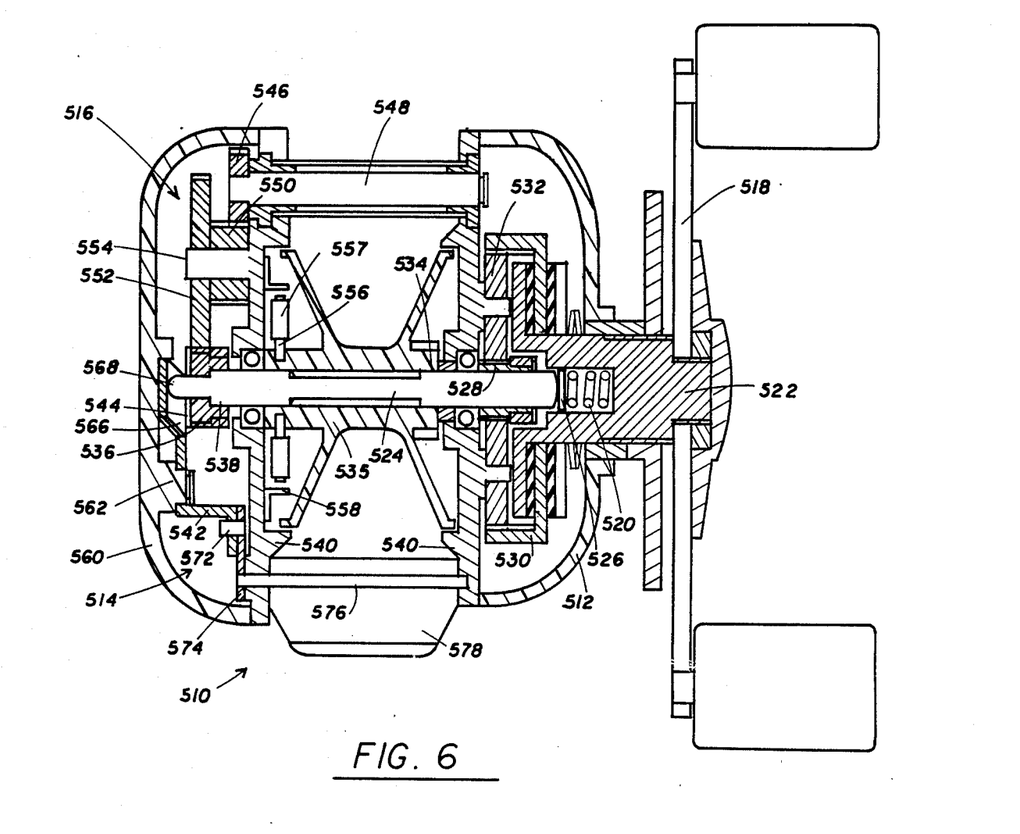
FIG. 6 is a section view of still another embodiment of this invention.
Figure 6A:
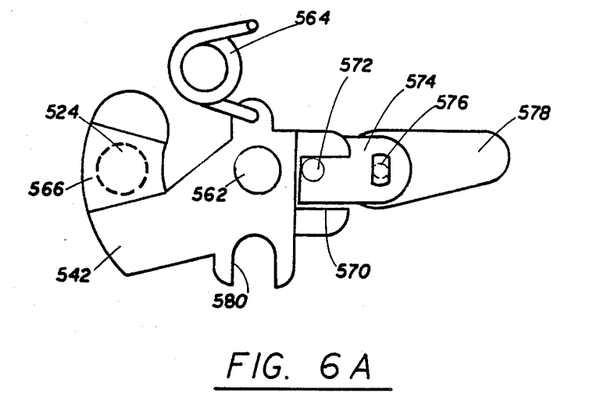
FIG. 6A is a partial view showing a portion of the free spool mechanism of FIG. 6.

The Embodiment of FIGS. 6 and 6A

The reel 510 of this embodiment has the free spool mechanism 514 and the level wind mechanism 516 moved to the side of the reel 510 opposite to that on which the handle 518 is mounted in order to reduce the size of the side plate 512.

A spring 520 is disposed between the handle shaft 522 and the spool shaft 524 to bias the spool shaft 524, through shim 526 away from the handle shaft 522. The spool shaft 524 is keyed in, but is axially slideable in, the pinion gear 528 which, in turn, is driven by the ring or universe gear 530 through planetary gears 532. The spool shaft 524 is axially slideable through the spool 535 to which it is keyed at 534 so that the spool rotates with it. The spool shaft 524 is axially slideable through the gear 536, but it is keyed to the gear at 538 to rotate therewith. The gear 536 is axially fixed between the main frame 540 and the free spool cam 542 through a shim 544. The level wind gear 546 is fixed to the level wind screw 548 to rotate therewith. Gears 550 and 552 are fixed together to rotate as a unit on the main frame 540 on pin 554. The gear 552 engages the gear 536 and the gear 550 engages the level wind gear 546 so that the level wind screw 548 is driven by the spool shaft 524 through gears 536, 552, 550 and level wind gear 546.

A centrifugal casting brake comprising components 556, 557 and 558 is of conventional configuration.

The free spool cam 542 (FIG. 6A) is pivotally mounted on the side plate 560 on a pin 562, and is urged to one extreme or the other of its pivotal range under bias of an eccentric spring 564. The free spool cam 542 has a ramped or cam portion 566 which engages the rounded end 568 of the spool shaft 524. The free spool cam 542 has a slotted portion 570, which is engaged by the pin 572 carried on a lever 574. The lever 574 is fixed to pin 576 which is fixed to the thumb bar 578. The pin 576 is pivotally mounted in the main frame 540. The thumb bar iss biased by a spring means (not shown) to a substantially horizontal position, i.e. substantially parallel to the fore and aft axis of the reel 510.

When the thumb bar 578 is pressed downward, the lever 574 urges the free spool cam 542, through pin 572 to pivot about the pin 562, whereby the cam portion 566 urges the spool shaft to the right in FIG. 8, against the spring 520. This unkeys the gear 536 at 538, as well as the spool 535, at 534. Thus, the spool 535 is completely disconnected from the driving mechanism for free spool casting. When the thumb bar 578 is released it is returned to substantially horizontal position by spring action (not shown). Then, when the handle 518 is turned, suitable means such as that described at 344 in FIG. 4A, engages the free spool cam 542 at 580 hence, the free spool cam 542 is urged to pivot to its starting position where it is held by force of the spring 564. As the free spool cam 542 pivots back to its normal position, the cam portion 566 disengages the rounded end of the spool shaft 524, allowing the spring 520 to bias the spool shaft 524 back to the position shown in FIG. 6, where it keys with the spool shaft at 534 and with the gear 536 at 538. In this condition, all driving mechanisms are again connected, whereby rotation of the handle 518 drives the spool 535 and level wind 548.

While this invention has been described in conjunction with preferred embodiments thereof, it is obvious that modification and changes therein may be made by those skilled in the art to which it relates without departing from the spirit and scope of this invention, as defined by the claims appended hereto.

What is claimed as invention is:

1. A drive system for a fishing reel comprising:
   a main frame;
   a spool shaft rotatable on said frame and carrying a spool for a fishing line;
   a driven pinion;
   a handle shaft rotatable on said frame in axial alignment with said spool shaft;
   a ring gear driven by said handle shaft;
   a planetary gear carrier;
   a plurality of planetary gears rotatable on said carrier engaging said ring gear and said driven pinion;
   said planetary gears being equally spaced around said pinion;
   means holding said planetary gear carrier against rotation on said main frame;
   means for selectively keying said driven pinion onto one end of said spool shaft;
   a coaxial recess in said handle shaft of a size to receive said driven pinion freely;
   yieldable means biasing said driven pinion into driving engagement with said spool shaft; and
   free spool cam means for engaging said driven pinion and shifting it axially into said recess to disengage said driven pinion from said spool shaft.

2. The drive system defined by claim 1 including:
   a level wind screw parallel to said spool shaft;
   a driven gear on said level wind screw;
   an external driving gear on said ring gear engaging said driven gear;
   means on said level wind screw for disengaging said free spool cam means from said driven pinion in response to rotation of said level wind screw.

3. The drive system defined by claim 1 including:
   manually adjustable, speed-responsive means located at the other end of said spool shaft for retarding rotation of said spool shaft; and
   manually adjustable friction means engaging said other end of the spool shaft to retard rotation thereof.

4. The drive system defined by claim 3 wherein said manually adjustable, speed-responsive means include:
   inner and outer concentric, rotatable control knobs;

and dial readings on said control knobs which are readable relative to each other.

5. The drive system defined by claim 4 including:
arcuate recesses of tapered depth in said outer control knob;
adjustment means on said speed-responsive means in engagement with said recesses for axially moving said speed responsive means in response to rotation of said outer control knob.

* * * * *